United States Patent [19]

Todd

[11] Patent Number: 4,656,633

[45] Date of Patent: Apr. 7, 1987

[54] ERROR CONCEALMENT SYSTEM

[75] Inventor: Craig C. Todd, Mill Valley, Calif.

[73] Assignee: Dolby Laboratories Licensing Corporation, San Francisco, Calif.

[21] Appl. No.: 712,560

[22] Filed: Mar. 15, 1985

[51] Int. Cl.$^4$ .................................................. G06F 11/10
[52] U.S. Cl. .................................... 371/54; 375/34
[58] Field of Search ............ 371/53, 54, 55, 56, 371/57; 375/34, 58

[56] References Cited

U.S. PATENT DOCUMENTS

| | | | |
|---|---|---|---|
| 2,910,234 | 10/1959 | Shafer et al. | 371/53 |
| 2,911,149 | 11/1959 | Rouche | 371/53 |
| 2,977,047 | 3/1961 | Bloch | 371/53 |
| 3,458,860 | 7/1969 | Shimabukuro | 371/53 X |
| 3,573,729 | 4/1971 | Gunn et al. | 371/56 |
| 3,783,383 | 1/1974 | Forster et al. | 371/56 X |
| 3,902,117 | 8/1975 | Sheppard | 371/56 X |
| 3,913,016 | 10/1975 | Candy | 371/56 X |
| 4,244,052 | 1/1981 | Hemsworth | 371/56 X |
| 4,309,694 | 1/1982 | Henry | 371/55 X |
| 4,507,783 | 3/1985 | Austin et al. | 371/49 |

FOREIGN PATENT DOCUMENTS 1423776  2/1976  United Kingdom ................. 371/56

Primary Examiner—Charles E. Atkinson
Attorney, Agent, or Firm—Majestic, Gallagher, Parsons & Siebert

[57] ABSTRACT

The error concealment system of the invention is for use with a delta modulation or delta signal modulation decoder which decodes digital signals received through a transmission or storage medium from an encoder. The encoder groups the digital signals into a plurality of blocks of one bit words. The decoder also receives from the encoder information related to the number of 1's in each of the blocks of one bit words before transmission or storage. The system comprises means for deriving information on the number of 1's in each received block of words and for comparing such information to the information received from the encoder to determine the presence and polarity of any bit errors. The system further includes means for introducing into each received block determined to contain one or more errors at least one bit error of the opposite polarity from that determined to conceal at least some of the effects of the bit errors.

25 Claims, 3 Drawing Figures

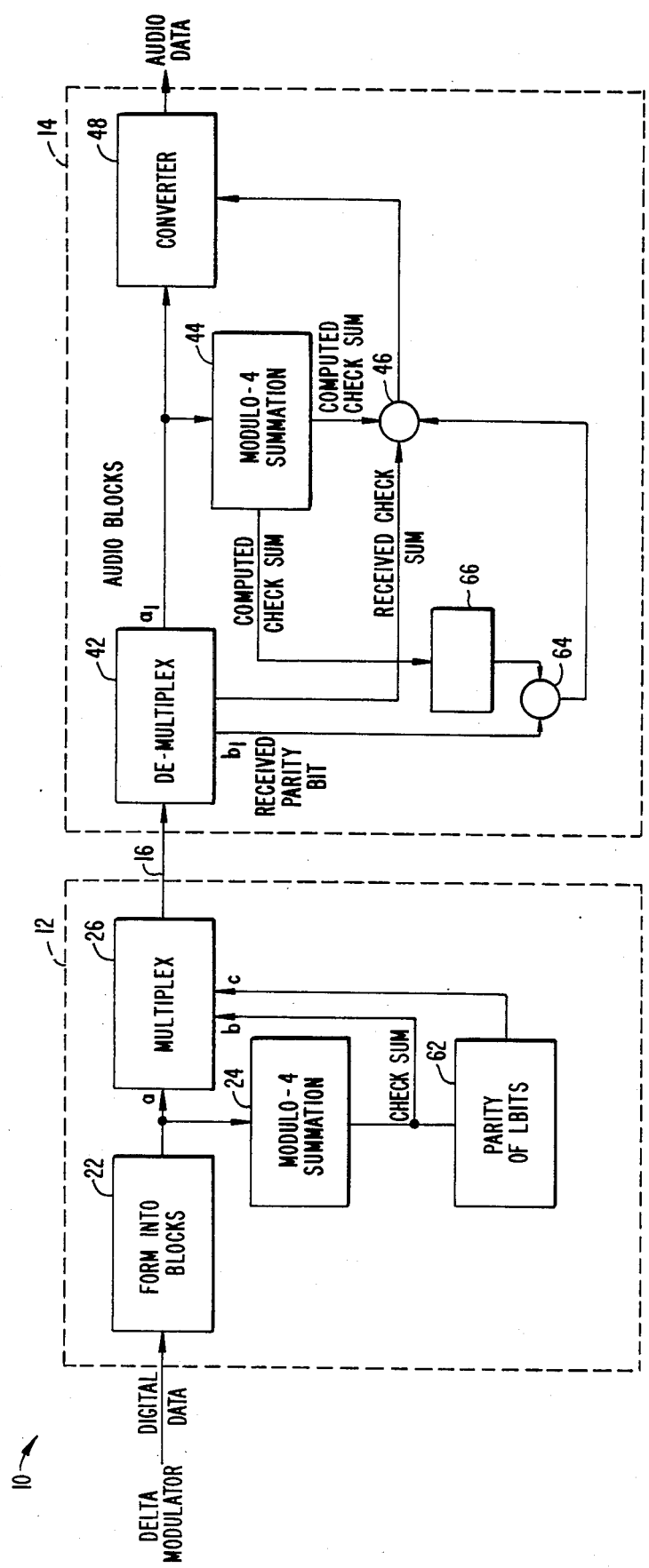
FIG._1.

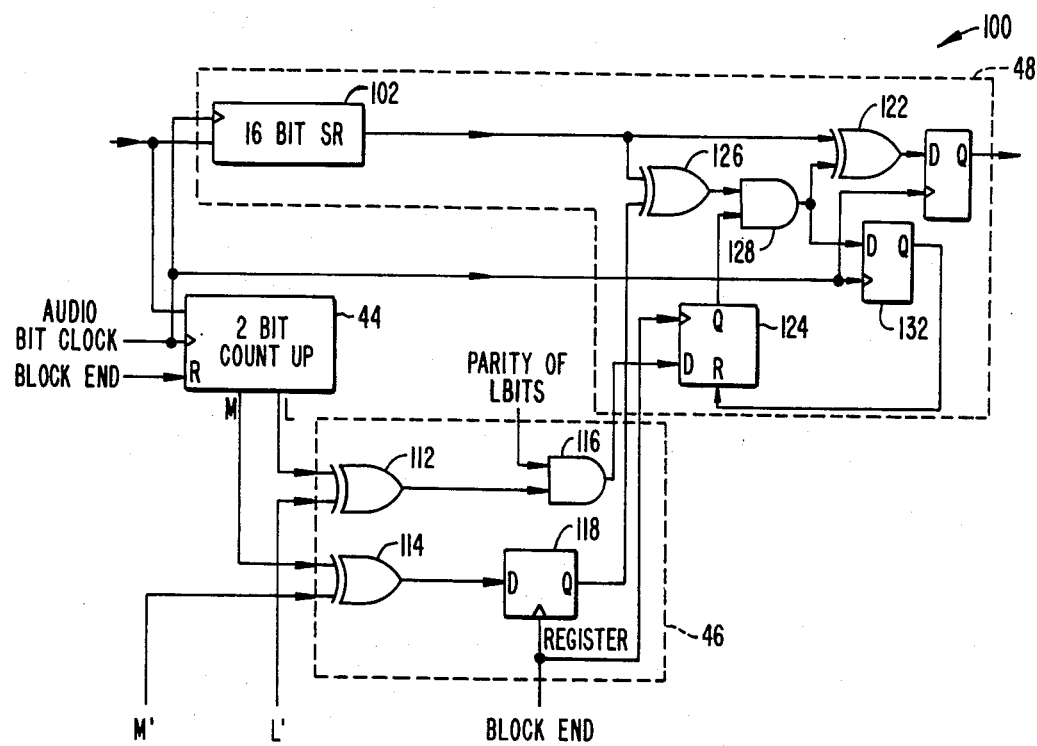
FIG._2.
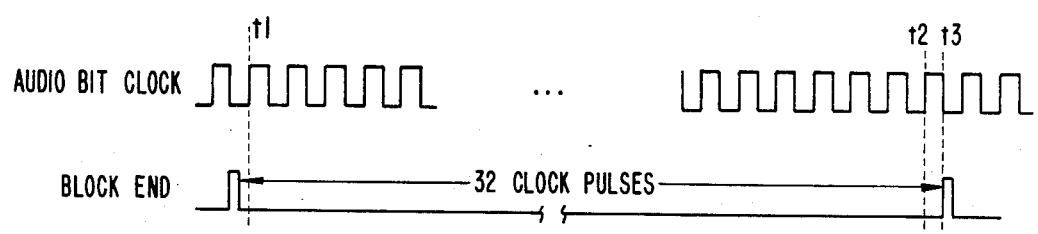
FIG._3.

ERROR CONCEALMENT SYSTEM

BACKGROUND OF THE INVENTION

This invention relates in general to digital systems which compensate for transmission errors and in particular to error concealment systems suitable for use in the transmission or storage of digital data employing delta modulation.

When digital signals are transmitted through or stored on a medium, transmission or storage errors frequently cause the digital signals received to be different from those transmitted. In one form of forward error control known as forward error correction, redundant information is transmitted along with digital data to the receiver where the redundant information is used to detect errors in the transmitted digital data and to correct such errors.

In PCM systems each sample is transmitted or stored as a word of binary digits ranging from the least significant bit to the most significant bit. A reproduced transmission or storage error occurring at the most significant bit will have a vastly greater effect than an error occurring at or near the least significant bit. Thus it is important that bit errors occurring in the more significant bits of a PCM word not be reproduced into audio. In order to detect and correct errors with a high degree of certainty, a large amount of redundant information must be transmitted. This accounts for the high overhead required for forward error correction in many PCM systems. In conventional pulse code modulation (PCM) audio systems for compact discs or tapes, the redundant information transmitted or stored for forward error correction can be as high as 50% of the total information transmitted or stored.

Many techniques have been employed for detecting the presence and location of transmission bit errors in PCM systems. In one form of error detection, group check characters each conveying the number of 1's in a group of data are transmitted in addition to the groups of data. At the receiving end, the numbers of 1's in the received groups of data are then computed and compared with the received group check characters to detect the presence of transmission bit errors. The redundant information carried by the group check characters, while useful for detection of the presence of errors within a group, does not indicate the location of the bit errors among the bits of the group. To determine the locations of the errors within the group so that they can be corrected, additional information is required.

There are many common codes in use to provide this information. Two general types of commonly used codes are block codes and convolutional codes. Block codes involve grouping the data bits into blocks and adding redundant information to each block. The redundant information may be simple row, column parity, or the result of a code generating polynomial. The amount of redundant information which must be added to the original data depends on the error rate to be handled and the level of performance required. In order to get the maximum theoretical amount of performance out of a specific amount of overhead information, complex calculations are required to generate the redundant information and this requires complex and expensive circuitry. Convolutional codes involve treating the digital data as a single serial stream and increasing the data rate by some ratio (for instance 4/3). Simple versions of these codes can be simply implemented, but they are not really appropriate for audio systems and are not relevant to the present invention.

While it is desirable to correct all errors, the burden of carrying a large amount of redundancy and of building the required error correction hardware is such that alternatives are desirable. Also, any error correction system will break down when the error rate increases to a certain limit, and it is desirable that the now uncorrectable errors not be reproduced. For this reason PCM systems typically incorporate error concealment in addition to or instead of error correction. The overhead and hardware required for error concealment may be much less than that required for error correction. Error concealment for PCM works by detecting that a PCM word contains an error, although which bit is in error is not determined. That entire word is discarded and replaced by an estimate of what it was. The estimate may be based on the value of the adjacent words. The redundant information to detect an error in a PCM word is often simply a parity bit added to a word. The overhead for PCM error concealment is often on the order of 5-15%. This technique provides a substantial improvement in sound quality with a modest amount of overhead and extra circuitry.

In digital audio systems the audible effect of a transmission bit error depends on the energy of the disturbance in the output analog waveform caused by the error. In a PCM system the disturbance caused by an error takes the form of a narrow pulse with its width equal to the length of the sampling period and its size depending upon which bit is hit, being very large for a hit on a most significant bit. The result of error concealment in a PCM system is to greatly reduce the amplitude of the disturbance which is added to the reproduced audio. Thus, error concealment as applied to PCM systems greatly reduces the energy of the disturbance and thereby also reduces the audible effect of the error.

Delta modulation systems have the advantage that they are inherently less impaired by transmission or storage bit errors than PCM systems. Unlike PCM systems where a most significant bit error can produce a full scale spike, the disturbances in the output analog waveform caused by transmission or storage bit errors in delta modulation systems are all of the same size which is considerably less than the full scale spike in PCM systems. It is known in the art that the effect of a transmission or storage bit error on a delta modulation system is to produce a permanent shift in DC level in the received or reproduced audio. A conventional technique for correcting the DC shift is to use a leaky integrator in the delta demodulator at the receiving end of the system. The leaky integrator causes the DC shift to decay over a time period depending on the time constant of the integrator. Typically, the time constant of the integrator is much greater than the length of the sampling period in the typical PCM system. Thus, in the case of delta modulation, the disturbance takes the form of a small decaying step of significant length. A delta modulation system performing at the same error rate as a PCM system is inherently less impaired by bit errors than the PCM system. When the error rate is low (on the order of $10^{-5}$), a delta modulation system is quite usable for high quality audio without any error correction or concealment, while a PCM system is not.

At higher error rates, the disturbance to a delta modulation system, while still smaller in size than that to a PCM system, can still result in a clearly audible impairment. It is therefore desirable to provide a system to reduce the effect of transmission and storage bit errors on delta modulation systems.

Error correction schemes have been applied to delta modulation systems. Robert W. Adams, in the article "Companded Predictive Delta Modulation: A Low-Cost Conversion Technique For Digital Recording", Journal of Audio Engineering Society, Vol. 32, No. 9, pages 659–672, September 1984, describes an error correction scheme for delta modulation systems. Adams employs a convolutional code of rate ¾ (4 transmitted bits for every 3 data bits). While the error correction scheme described by Adams is for a delta modulation system, it is similar to those commonly applied to PCM systems. Where a series of uncorrectable errors occurs, a string of alternating 1's and 0's is substituted for the bit stream. This has the effect of freezing the output waveform which is somewhat equivalent to the PCM technique of substituting the last sample for the present, although when correct data is again received, the reproduced audio will have picked up a D.C. step unless the correct data contained an equal number of 1's and 0's.

Norm Scheimberg and Donald Schilling, in an article "Techniques For Correction Transmission Errors in Video Adaptive Delta Modulation Channels", IEEE Transactions on Communications, Vol. COM-24, No. 9, 1064–70, September, 1976, disclose a technique for correcting the permanent shift in DC level caused by transmission bit errors in delta modulation systems. To correct the DC shift, periodically the current value of the absolute amplitude of the signal at the transmitter is sent to the receiver. The receiver then compares the current amplitude of the received signal with the value received from the transmitter to correct the DC shift. If the technique were applied to audio data transmission, unless the absolute amplitude of the signal were transmitted periodically at a high frequency, the duration of the disturbance would be such that little audible improvement would be realized. High frequency transmission of the absolute amplitude would significantly increase the overhead required and is therefore undesirable. Thus a more efficient technique is desirable.

SUMMARY OF THE INVENTION

This invention is based on the observation that the noticeable effects of the disturbances caused by transmission or storage bit errors to delta modulation systems can be reduced by a form of error control bearing some resemblance to error concealment in PCM systems discussed above. While the disturbances caused by transmission or storage bit errors to delta modulation systems are all of a size much smaller than that caused by a most significant bit error in PCM systems, they can be of significant durations so that they may still contain sufficient energy to have noticeable effects. The invention shortens the durations of the disturbances more effectively than the conventional leaky integrator described above and at a low overhead. When applied to audio delta modulation systems, the audible effects of the disturbances are reduced.

Since the purpose of the invention is to shorten the durations of the disturbances, it is sufficient to detect the approximate locations of the disturbances and to limit their durations. In contrast to forward error correction systems, the detection of the exact locations of the errors is unnecessary. The duration and energy of the disturbances are reduced by detecting only the approximate locations of the transmission errors (similar to error concealment in PCM systems), by detecting their polarities, and by introducing errors of the opposite polarities at or close to the approximate locations of the detected errors. Since the invention reduces the undesirable effects of transmission bit errors without correcting them exactly to recover the original digital signals before transmission, the invention is an error concealment system.

When two bit errors of opposite polarities occur close together in time in a delta modulation system, the disturbances caused by the errors will partially cancel each other since they are of the same size but have opposite polarities so that the net effect of the errors will be a disturbance having a duration equal to the time between the occurrences of the two bit errors. If such time is short, the effects of the two errors are self-concealing. It is therefore unnecessary, for the purpose of reducing the noticeable effects of the errors, to detect such self-concealing errors or to conceal them.

More specifically, one aspect of the invention is directed to an apparatus and method used with a delta modulation decoder for concealing transmission bit errors. The decoder decodes digital signals received from an encoder. The digital signals received includes data in the form of blocks of 1 bit words and information derived from the data at the encoder, the information being related to the number of 1's in each of the blocks. According to this aspect, the apparatus includes means for deriving information related to the number of 1's in each received block of words at the decoder and comparing such information to the corresponding information received from the encoder to detect the presence and polarity of any transmission or storage bit errors. The apparatus also includes means for introducing into each block of words received from the encoder determined to contain one or more bit errors at least one bit error of the opposite polarity from that detected.

Another aspect of the invention takes advantage of the self-concealment of errors occurring close in time; such aspect is the characteristic of an apparatus and method used with the encoder of a delta modulation transmission or storage system, the apparatus and method being complementary to those used with the decoder described above. The apparatus includes means for dividing the digital output signals of the encoder into a number of blocks of 1 bit words such that the blocks are each of durations less than a predetermined time period. If there had been two bit errors of opposite polarities close in time to each other, the duration of the disturbance will be short so that the two errors will self-conceal. Thus, these errors do not need concealment. The durations of the blocks are chosen such that the disturbances caused by errors of opposite polarity within the same blocks will be short enough in time to be unnoticeable. If the two errors occur within the same block, they will not be detected since they will not affect the total number of 1's in the block. Thus the durations of the blocks may advantageously be chosen to be such that errors of opposite polarity occurring in the same block will substantially self-conceal, and such that errors occurring not in the same block but in adjacent blocks are too far apart to be self-concealing. Errors occurring in adjacent blocks will affect the total number of 1's in the blocks and will therefore be detected and concealed. In the preferred embodiment, the block durations are chosen to be less than a predetermined time period which is of the order of about 200 microseconds.

BRIEF DESCRIPTION OF THE DRAWINGS

FIG. 1 is a block diagram of an error concealment system. The system includes a portion used with a delta modulator at the transmitting end and a portion to be used with a delta demodulator at the receiving end of the data transmission for concealing transmission errors.

FIG. 2 is a schematic circuit diagram showing in more detail a part of the error concealment system of FIG. 1 to illustrate the preferred embodiment of the invention.

FIG. 3 is a timing diagram illustrating the circuit of FIG. 2.

DETAILED DESCRIPTION OF THE PREFERRED EMBODIMENT

Since the invention described below is equally applicable to the transmission and to the storage of data, the discussion below will refer only to its application to transmission of data, with the understanding that the invention is applicable in the same manner for the storage of data.

FIG. 1 is a block diagram of an error concealment system 10 to illustrate the preferred embodiment of the invention. System 10 comprises a portion 12 which is used in conjunction with a delta modulator at the encoding end for encoding analog audio signals into digital audio signals and for deriving redundant information from the digital signals to be transmitted. System 10 also includes a portion 14 for use in conjunction with a delta demodulator for decoding the digital signals received through a medium 16 from the delta modulator and portion 12 for detecting and concealing transmission bit errors.

Analog audio signals are first converted into digital signals by a delta modulator (not shown) and then supplied to portion 12. In portion 12 the digital data are formed into blocks of 1 bit words by means 22. The blocks of digital data are then supplied to modulo 4 adder 24 where modulo 4 summations are performed on the words in each of the blocks. In other words, the number of 1's in each block is counted and the result divided by 4 to obtain a remainder. The remainder is useful for detecting the presence and polarity of any transmission errors and is referred to below as the check sum for the block.

The blocks of digital audio data from means 22 and the check sums corresponding to the blocks from adder 24 are correlated in a manner for transmission so that each check sum may be identified with the corresponding block at the receiving end. In the preferred embodiment illustrated in FIG. 1, the correlation is performed by a multiplexer 26. The blocks of data and the check sums are then transmitted through a medium 16. The transmitted digital signals are received through medium 16 by a de-multiplexer 42 which allows the digital audio data blocks to be identified with their corresponding check sums. It will be understood that means other than multiplexers and de-multiplexers may be used so long as the alternative means allows the check sums to be identified with their corresponding blocks at the receiving end. All such configurations are within the scope of this invention.

The de-multiplexer 42 supplies the received audio data blocks to a modulo 4 adder 44 which counts the 1's in each received block and divides the total by 4 to obtain a remainder. Such remainder will be referred to below as the computed check sum for such block. The check sum for such block calculated by modulo 4 adder 24 at the transmitting end is also received by de-multiplexer 42 and will be referred to below as the received check sum. A comparison of the two check sums for the same block will yield information on the presence and polarity of any transmission bit errors in the block in a manner described below.

The computed check sums for the blocks are supplied to a comparator 46 to which the received check sums from de-multiplexer 42 are also supplied. Comparator 46 compares the two check sums to determine the presence and the polarity of any transmission bit errors in the block. The information derived from such comparison is supplied by comparator 46 to a converter 48 for introducing an error of the opposite polarity to that detected in the block. The digital audio data blocks are also supplied by de-multiplexer 42 to converter 48. By introducing an error of the opposite polarity in the block to that caused by transmission the duration of the disturbance caused by a transmission error is thereby reduced. Hence the energy of the disturbance and its audible effect are also reduced. The manner in which the presence and polarity of transmission bit errors in the data blocks are detected will be described below.

An audio block may, for example, contain 10 to 30 1-bit words so that the number of 1's in the block may be as high as 30. If the number of 1's in the block of data were to be transmitted, five bits would be required. If the transmission error rate is moderate so that there is only a small number of bit errors within a block, then the number of 1's in the received block will differ from the true number by a small number. This characteristic can be advantageously used to reduce the number of bits required to transmit the number of 1's in a block. Instead of transmitting the number of 1's in the block, the check sum resulting from a modulo n summation performed on the bits in the block is transmitted instead, where n is a positive integer. Modulo n summation and check numbers resulting therefrom are explained in more detail in *IEEE Standard Dictionary Of Electrical and Electronics Terms*, 3rd Edition, 1984, The Institute of Electrical and Electronics Engineers, Inc., New York, NY.

A modulo 4 summation performed on the bits in the block may be suitable where the number of transmission bit errors in each block is no greater than 2. In modulo 4 summation the check sum can take on any one of 4 values: 0, 1, 2 or 3. In binary form they are 00, 01, 10 and 11. Thus, instead of having to transmit or store five bits of information to convey the number of 1's, only two bits of information will need to be transmitted to convey the check sum from adder 24.

The received check sum supplied to comparator 46 may thus be any one of the 4 values: 00, 01, 10 and 11. The modulo 4 adder 44 at the receiving end performs the same operation on the corresponding received digital audio block to obtain the computed check sum which can also be any one of the 4 values.

The method for deriving the presence and polarities of bit errors in the blocks from a comparison of the two check sums for the same blocks, with certain assumptions made concerning the transmission error rate, will now be described in reference to the table below. In the following table, the possible numbers of 1's in the transmitted block and those in the corresponding received block are listed in the two end columns. The received check sums corresponding to the number of 1's in the transmitted block listed and the computed check sums corresponding to the number of 1's in the received block listed are set forth in the middle columns.

| Number of 1's in Transmitted Block | Received Check Sum | Computed Check Sum | Number of 1's in Received Block |
|---|---|---|---|
| 0 | 00 | 00 | 0 |
| 1 | 01 | 01 | 1 |
| 2 | 10 | 10 | 2 |
| 3 | 11 | 11 | 3 |
| 4 | 00 | 00 | 4 |
| 5 | 01 | 01 | 5 |
| 6 | 10 | 10 | 6 |
| 7 | 11 | 11 | 7 |
| 8 | 00 | 00 | 8 |
| . | . | . | . |
| . | . | . | . |
| . | . | . | . |

Corresponding to each value of the received check sum, there can be a plurality of possible numbers of 1's in the transmitted block provided that any such number is not larger than the number of bits in the block. This is true also for the computed check sum and the number of 1's in the received block. If the received check sum is 10 and the computed check sum is 11, for example, the sum of 1's in the transmitted block may be any one of 2, 6, 10 etc., and the sum of 1's in the received block may be any one of 3, 7, 11 etc. Assuming that there are no more than 2 errors in any block, however, we can vastly reduce the possibilities. In the above example, the sum of 1's in the received block can only be greater than that in the received block by 1, since any other choice would indicate the occurrence of at least 3 transmission errors of the same polarity in the received block. Since it is unlikely for there to be three errors of the same polarity in the same block, it is concluded that during transmission, a 0 has been turned into a 1. The same result will be obtained whenever the computed check sum is greater than the received check sum by 1, that is, when the received and computed check sums take on any one of the following pairs of values: 00,01; 01,10; 10,11. Thus, whenever the computed check sum is greater than the received check sum by 1, it is concluded that a 0 has been turned into a 1.

A transmission error which results in a 0 being converted into a 1 will be referred to as a positive error. Conversely, a transmission error which results in a 1 being converted into a 0 will be referred to as a negative error.

To correct the positive transmission error the information on the positive error from comparator 46 causes converter 48 to introduce a negative error in the corresponding audio block. While a positive error in the audio block has been detected, information on the location of the error within the block is not available. However, by introducing into the block an error of opposite polarity, the duration of the disturbance is shortened thereby reducing the audible effects of the error. Since the error may have an equal chance of occurring at any bit in the block the error of opposite polarity is introduced at or as close to the center of the block as possible. A negative error is introduced by converting a 1 in the block to a 0. Thus, if there is no 1 at the center of the block, it is preferably for converter 48 to find a 1 as close to the center of the block as possible in order to introduce the negative error. Thus, it is not always possible to introduce the error exactly at the middle of the block. By introducing the error at or near the middle of the block the distance between the real and the artificial errors introduced will then be between 0 and m/2 bits with an average distance of m/4 bits, where the block contains m bits. Thus, the duration of the error signal will be on the average m/4 bits in length. While it is the most effective to introduce the artificial error close to the center of the block, it is not essential to do so to gain a useful improvement.

If the computed check sum is less than the received check sum by 1, it is concluded that there has been a negative transmission error, since all other choices require that there be at least three errors of the same polarity in the same block which is unlikely. Converter 48 introduces a positive error at or close to the center of the block by converting a 0 into a 1.

If the computed checked sum is greater or less than the received checked sum by 2, the polarity of transmission errors cannot be determined. When the check sums differ by 2, 2 errors of the same polarity have been detected. The number of 1's in the transmitted block may be greater than the number of 1's in the received block by 2. However, as will be obvious from the above table, there is also an equal chance for the number of 1's in the transmitted block to be less than the corresponding number in the received block by 2. There is simply inadequate redundant information to ascertain which is the case. Thus, when the received check sum and the computed check sum differ by 2 no error is introduced by converter 48. In many transmission media the error rates are such that it is unlikely for a block of 10 to 30 bits to contain more than 1 bit error. Thus, it may be rare for two errors of the same polarity to occur within the same block. When such event occurs, no error concealment is possible. However, as discussed above, delta modulation systems are inherently tolerant of transmission and storage errors so that such rare occurrences of unconcealed double errors of the same polarity may be acceptable.

When two transmission errors of the opposite polarity occur within the same block, such errors will not be detected by system 10 since the errors will leave the number of 1's in the block unchanged. However, the duration of the disturbance caused will be shorter than the length of the block or m bits. Thus, they may be too short to cause any significant audible distortions provided that the duration of the block is chosen in means 22 to be short. In the preferred embodiment, the duration may be chosen to be less than 200 microseconds. In such event, the frequencies of the disturbances caused by double errors of opposite polarities are greater than 5 kHz, so that they are largely beyond the audible frequencies.

As a result of the modulo summation, where the received check sum is greater than the computed check sum by 3, it is possible for there to be a positive transmission error. For example, where the number of 1's in the transmitted block is 7 and that in the received block is 8 the received check sum will be 11 and the computed check sum will be 00. While the check sums may also indicate the presence of three negative errors, this is unlikely assuming a moderate error rate. Thus where the received check sum is greater than the computed check by 3, it is concluded that there has been a positive transmission error. Similarly, where the received check sum is less than the computed check sum by 3, it is concluded that there has been a negative transmission error instead of three positive errors.

Blocks of lengths ranging from 8 bits to 64 bits have been found to be useful. Longer block lengths do not yield a significant audible improvement and are unlikely to be used. In general, the shorter the block length, the more effective the concealment of errors. However, block lengths shorter than 8 are not efficient because of the large overhead, and little further improvement is gained by using such very short block lengths.

Some transmission errors will hit the check sum transmitted through medium 16 so that system 10 may misconceal. The two bits of the check sum may be designated as Mbit and Lbit. If a transmission error hits the Lbit, then the system will decide that a single error has occurred in the data and will introduce an error of 'opposite' polarity. Since the error was actually in the check sum and not in the data the system will have introduced a data error which we refer to as misconcealing. If the Mbit is hit by an error during transmission, then the system will assume that two errors occurred during transmission and, since it cannot conceal double errors, it will do nothing. Thus Lbit errors are a problem. This problem can be simply dealt with by transmitting an extra bit which is a parity check on one or more Lbits. To obtain the parity bit the Lbits of one or more check sums from adder 24 are supplied to parity generator 62 and the parity bit is transmitted along with the corresponding check sums and audio data blocks to portion 14. At the receiving end the de-multiplexer 42 supplies the received parity bit to comparator 64. The Lbits from computed check sums from adder 44 are supplied to parity generator 66 which supplies the parities of the computed check sums to comparator 64. If the received parity bits are different from the computed parity bits this indicates that the received check sums contain transmission errors. This causes comparator 46 to stop any concealing information supplied to converter 48. Misconcealing is thus essentially eliminated.

From the above it will be noted that the polarity of the transmission errors is detected by comparing the computed check sum and the received check sum, based on certain assumptions about the number of errors in the block. It will be noted that other types of modulo summations are possible. In the general case a modulo n summation is performed on the 1 bit words in the block to be transmitted. A parallel summation is performed at the receiving end for detecting transmission errors. If the error rates are such that there are usually no more than one transmission error within any block then the following simplified result can be obtained. If the computed check sum is greater than the received check sum by 1 or if the received check sum is greater than the computed check sum by n−1 then it is concluded that there has been a positive transmission error. If the computed check sum is detected to be less than the received check sum by 1 or if the received check sum is detected to be greater than the computed check sum by n−1 it is assumed that there has been a negative transmission error.

It will be noted that a modulo 2 summation would not yield information sufficient for detecting the polarity of the error. If the error rate is such that no more than one error occurs in any block then a modulo 3 summation will supply sufficient concealment information. Two bits will be required to transmit the resulting check sums. If a modulo 3 summation is applied where there are 2 errors in the block, however, 2 errors of the same polarity within the same block may be treated as a single error of the opposite polarity. In such circumstances instead of concealing the double error the concealment information applied using modulo 3 summation will exacerbate the error. Thus, an error concealment scheme using modulo 3 summation is undesirable where there is any significant probability for there to be two errors of the same polarity within the same block.

If a modulo 5 summation is used to provide concealment information it is possible to detect positive and negative double errors as well as positive and negative single errors of the same polarity within the same block if it is assumed that the error rates are such that no more than two errors of the same polarity are expected to be in the same block. Thus, if the computed check sum is smaller than the received check sum by 3 it is concluded that there has been two positive transmission errors in the block. Similarly if the computed check sum is detected to be greater than the received check sum by 3 it is assumed that there has been two negative transmission errors within the same block. It is therefore possible to detect positive and negative double errors of the same polarity as well as positive and negative single errors within the same block. Three bits are required to transmit the check sums.

As discussed above in the summary of the invention, the duration of the blocks may be chosen so that double errors of the opposite polarity occurring within the same block are close enough to be substantially self-concealing, while those occurring far enough to be in adjacent blocks are detected and concealed as described above. To accomplish this result, the durations of the blocks are chosen to be in the range 50 to 200 microseconds in the preferred embodiment.

FIG. 2 is a schematic diagram of a circuit 100 showing in more detail adder 44, comparator 46 and converter 48 in the error concealment system of FIG. 1 to illustrate the preferred embodiment of the invention. In the preferred embodiment, the audio blocks each contains 32 bits. The 32 bit audio blocks are supplied to adder 44 and to a 16 bit shift register 102 clocked by an audio bit clock. Adder 44 comprises a 2 bit flip-flop which stops counting if a 0 is encountered in the audio bit stream but increments by 1 when a 1 in encountered. Adder 44 thus counts the number of 1's in each block. The counting is triggered by the block end pulse from the previous block, timed by the audio bit clock and the adder is reset to 00 by the next block end pulse. The block end pulses are related to the audio bit clock in a manner shown in FIG. 3.

FIG. 3 is a timing diagram of the audio bit clock and the block end pulses for indicating the ends of the 32 bit blocks. As illustrated in FIG. 3, there are thirty-two clock pulses between block end pulses. Each audio bit clock pulse clocks one bit of audio data for processing by portion 14 of FIG. 1 and by circuit 100. Therefore, thirty-two bits of audio data are clocked between each pair of successive block end pulses. At time t1 in FIG. 3, for example, the block end pulse immediately before t1 resets adder 44, which starts counting. The first audio bit clock pulse after time t1 clocks in the first bit of the next 32 bit block of audio data. Since adder 44 and the 32 bit audio block are clocked by the same audio clock, adder 44 will perform modulo 4 summation of the number of 1's in the 32 bit block. At the time of the rising edge of the thirty-second audio bit clock pulse after time t1, that is at time t2, adder 44 and shift register 102 will begin to process the last bit of the 32 bit block. At the onset of the next block end pulse at time t3, adder 44 completes its count for the 32 bit block. Adder 44 provides the 2 bit output, the two bits indicated by M and L in FIG. 2, to two XOR-gates 112, 114 in comparator 46. The block end pulse also resets the adder for the next counting cycle for the next 32 bit block. The output of adder 44, composed of bits M and L, may be continually changing throughout the time period between the two block end pulses. At time t3 of the next block end pulse, M and L carry the true and final result of modulo 4 summation of the number of 1's in the preceding 32 bit block, and the comparator 46 is enabled to compare the M and L bits so obtained representing the computed check sum with bits M', L' representing the received check sum from de-multiplexer 42. Since shift register 102 holds only 16 bits, at time t3 the first 16 bits of the preceding 32 bit block have already passed through the register, so that the register retains only the last 16 bits of the block. Thus, at time t3, the 16th bit in the preceding block has been provided to XOR-gate 122 of converter 48 for possible conversion.

The two pairs of bits M, M' and L, L' are supplied to XOR-gates 112, 114 respectively to determine whether any of the audio bits should be converted by converter 48 or not. The scheme for comparison in comparator 46 may be illustrated by means of the following table:

| Number of 1's in Transmitted Block | Received Check Sum M'L' | Computed Check Sum ML | Number of 1's in Received Block |
|---|---|---|---|
| 0 | 00 | 00 | 0 |
| 1 | 11 | 01 | 1 |
| 2 | 10 | 10 | 2 |
| 3 | 01 | 11 | 3 |
| 4 | 00 | 00 | 4 |
| 5 | 11 | 01 | 5 |
| 6 | 10 | 10 | 6 |
| 7 | 01 | 11 | 7 |
| 8 | 00 | 00 | 8 |
| . | . | . | . |
| . | . | . | . |
| . | . | . | . |

In the table above, it will be noted that, if the number of 1's is 1, the received check sum M'L' is 11 instead of 01, and if the number of 1's is 3, the received check sum is 01 instead of 11. Since 01 is equivalent to 11 in modulo 4 summation, the above substitutions are permissible. Similar substitutions have been performed for cases where the number of 1's in the transmitted block is 5, 7, ... and so on. To accomplish the values for the received and computed check sums corresponding to the number of 1's listed in the above table, the modulo 4 adder 24 at the encoding end may be chosen to be a count-down counter, whereas adder 44 may be chosen to be a count-up counter. Alternatively, both modulo 4 adders may be count-up counters and the above described substitutions may be performed by logic circuits in a conventional manner.

With the values of the bits M', L', M, L set forth in the above table, the construction of comparator 46 may be simplified. As shown in FIG. 2, the comparator 46 constructed on the basis of the table comprises XOR-gates 112, 114, AND-gate 116 and flip-flop 118. From the table, it will be evident that whenever transmission of the audio data causes a single positive error, L is different from L' but M is the same as M', whereas whenever a single negative error is caused, L is different from L' and M is different from M'. Thus, a comparison of L and L' indicates the presence of single errors, and a comparison of M and M' indicates the polarity of such error.

When L is different from L', XOR-gate 112 provides a high output to AND-gate 116; when L and L' are the same, XOR-gate provides a low output. The other input to AND-gate 116 is supplied with the parity comparison information from comparator 64; comparator 64 provides a high output when the comparison indicates that the received check sum is correct, and a low output when the comparison indicates an incorrect received check sum. Thus, AND-gate 116 enables the output of XOR-gate 112 to pass when the received check sum is correct and pulls it low when the received sum is incorrect. When the received check sum is correct, a high signal is applied to AND-gate 116, which provides a high signal to a flip-flop 124 in converter 48.

First, the case of a single positive error is considered. This is indicated by the condition that L is different from L' and M is the same as M'. When this happens, XOR-gate 114 provides a low output (0) to flip-flop 118. As described above, the values of M, L may continually change, which may cause the outputs of XOR-gates 112, 114 to continually change, so that the output of XOR-gate 114 indicates true polarity information for a 32 audio data block only at the end of the block. Flip-flop 118 will not record the output of XOR-gate 114 until it is enabled by a block end pulse from the received audio bit stream. In such manner, the true polarity information is stored by flip-flop 118. Similarly, the output of XOR-gate 112 indicates the true error information (1), indicating a single error at the occurrence of the block end pulse indicating the end of the block. When the parity information is correct, AND-gate 116 passes the true error information (1) from XOR-gate 112 to flip-flop 24, which stores the error information upon enablement by block end pulses.

The error information (1) and polarity information (0) are stored in flip-flop 124 and flip-flop 118 respectively. After the block end pulse, flip-flop 124 applies the error information (1) to AND-gate 128, and flip-flop 118 aplies the polarity information (0) to XOR-gate 126. Register 102 provides the 17th bit of the block to XOR-gate 126. XOR-gate 126 provides a high output if the 17th bit is a 1 and a low output if the 17th bit is a 0. If the 17th bit is a 1, XOR-gate 126 provides a high output, which together with the high output of flip-flop 124, causes the output of AND-gate 128 and consequently one input to XOR-gate 122 to be high. XOR-gate 122 then provides a 0 output, thereby inverting the 17th bit from a 1 to a 0. This introduces an artificial negative error. If the 17th bit is a 0, XOR-gate 126 provides a low output, which causes the output of AND-gate 128 to be low. This causes a low signal to be applied to XOR-gate 122, which also provides a low output. Thus, the value of the 17th bit remains unchanged. This is reasonable since no negative error can be introduced at an audio bit of value 0. The output of AND-gate 128 is clocked into flip-flop 132 whose output goes high only when a concealment has been performed. When the concealment is performed, the high output of flip-flop 132 resets flip-flop 124, which removes the error information so concealment stops. Thus only a single artificial error will be introduced.

In a similar manner, an artificial positive error may be introduced at one of the bits in the last half of the 32 bit block, the one bit being of 0 value, when a negative error is detected (indicated by L, M being different from L', M'). It will be evident from the above that the artificial error is introduced in the last half of the block and, if possible, as close to the 17th bit as possible.

Whenever two errors of the same polarity are caused, L is the same as L' but M is different from M'. This causes the output of XOR-gate 112, AND-gate 116, flip-flop 124 and AND-gate 128 to be low, thereby pulling low one of the inputs of XOR-gate 122. The output of XOR-gate will then simply follow the values of the audio bit stream and no artificial errors will be introduced. This is desirable since, as discussed above, nothing will be done to correct double errors of the same polarity.

While the error concealment system has been described above for concealing the effects of transmission errors in delta modulation systems, it will be understood that the system of this invention may be applied also to other 1 bit per sample coding systems, such as delta sigma modulation systems. The invention may be applied to conceal the effects of transmission errors in the transmission of digital signals other than audio data, such as video data. As described, the system of the invention counts the number of 1's in each block of data to determine the presence and polarity of transmission errors. It will be obvious that the number of 0's may be counted instead, and the system will function in essentially the same manner as described for concealing the effects of errors. All such variations in the system are within the scope of this invention.

The above description of circuit implementation and method is merely illustrative thereof and various changes in arrangements or other details of the method and implementation may be within the scope of the appended claims.

I claim:

1. An apparatus for concealing transmission or storage bit errors for use with a decoder which decodes digital signals received through a transmission or storage medium from an encoder system, wherein the digital signals have been grouped into a plurality of blocks of 1 bit words, and wherein the apparatus also receives through the medium information related to the number of 1's in each of the plurality of blocks of 1 bit words before transmission or storage of the blocks, said apparatus comprising:

means for deriving information on the number of 1's in each received block of words and comparing such derived information to the information received from the encoder system related to the number of 1's in such block before transmission or storage, and for determining, from such comparison, the presence and polarity of any transmission or storage bit errors; and means for introducing into each block of words received from the encoder system determined to contain one or more bit errors at least one bit error of the opposite polarity from that determined by the deriving, comparing and determining means to conceal at least some of the effects of the bit errors.

2. The apparatus of claim 1, wherein the encoder system performs modulo n summation of the words within each block and the resulting check number for each block is transmitted or stored with the words of the corresponding block to convey information related to the number of 1's in such block before transmission or storage, said check number being received at the decoder, n being a positive integer, and wherein the deriving, comparing and determining means derives information on the number of 1's in each of the received block of words by performing modulo n summation to arrive at a computed check number, compares the computed check number for the received block of words with the corresponding received check number, and determines the polarity of any transmission or storage errors from the comparison.

3. The apparatus of claim 2, wherein n is 3.

4. The apparatus of claim 2, wherein n is 4.

5. The apparatus of claim 4, wherein the value of each check number is 0, 1, 2 or 3 so that the check numbers transmitted are each a 2 bit digital number.

6. The apparatus of claim 1, wherein the duration of each block of words is less than a predetermined time period which is of the order of 200 microseconds.

7. The apparatus of claim 4, wherein the deriving, comparing and determining means determines that there is one transmission or storage error of positive polarity in a block when the computed check number for a block of words is greater than the received check number for such block by 1 or less than such number by 3, and wherein when a positive error is detected, the introducing means introduces an error of negative polarity in the block to conceal the transmission or storage error.

8. The apparatus of claim 4, wherein the deriving, comparing and determining means determines that there is one transmission or storage error of negative polarity in a block when the computed check number for a block of words is greater than the received check number for such block by 3 or less than such number by 1, and wherein when a negative error is detected, the introducing means introduces an error of positive polarity in the block to conceal the transmission or storage error.

9. The apparatus of claim 4, wherein the deriving, comparing and determining means determines that there are two transmission or storage errors of undetermined polarity in a block when the computed check number for a block of words and the received check number for such block differ by 2, and wherein when two errors of undetermined polarity are detected, the introducing means introduces no errors in the block.

10. The apparatus of claim 1, wherein the introducing means introduces the error, at or close to the center of the block of words, by converting a word containing a bit of value 1 to one containing a bit of value 0 when a positive transmission or storage error has been detected, or by converting a word containing a bit of value 0 to one containing a bit of value 1 when a negative error has been detected.

11. The apparatus of claim 1, wherein the duration of each block of words is less than a predetermined time period which is of the order of 200 microseconds.

12. The apparatus of claim 1, wherein the decoder decodes the signals received by delta modulation.

13. The apparatus of claim 1, wherein the decoder decodes the signals received by delta sigma modulation.

14. A method for concealing transmission or storage bit errors in digital signals received by a decoder from an encoder system through a transmission or storage medium, wherein the digital signals have been grouped into a plurality of blocks of 1 bit words, and wherein the decoder also receives from the encoder system information related to the number of 1's in each of a plurality of blocks of 1 bit words before transmission or storage of each block, said method comprising:

deriving information on the number of 1's in each received block of words, comparing such information to the information received from the encoder system related to the number of 1's in such block before transmission or storage, and determining, from such comparison, the presence and polarity of any transmission or storage bit errors; and introducing into each block of words received from the encoder system determined to contain one or more bit errors at least one bit error of the opposite polarity from that determined by the deriving, comparing and determining step to conceal at least some of the effects of the bit errors.

15. The method of claim 14, wherein the encoder system performs mudulo n summation of the words within each block to arrive at check numbers, and wherein the received information comprises check numbers received at the decoder, n being a positive integer, and wherein the deriving, comparing and determining step derives information on the number of 1's in each of the received block of words by performing modulo n summation thereon thereby deriving the computed check number, compares the computed check number for the received block of words with the corresponding received check number, and determines the polarity of any transmission or storage errors from the comparison.

16. The method of claim 15, wherein the deriving, comparing and determining step determines that there is one transmission or storage error of positive polarity in a block when the check number for a block of words resulting from such step is greater than the received check number for such block by 1 or less than the received check number for such block by n−1, and wherein the introducing step introduces an error of negative polarity in the block to conceal the transmission or storage error.

17. The method of claim 15, wherein the deriving, comparing and determining step determines that there is one transmission or storage error of negative polarity in a block when the check number for a block of words resulting from such step is greater than the received check number for such block by n−1 or less than the received check number for such block by 1, and wherein the introducing step introduces an error of positive polarity in the block to conceal the transmission or storage error.

18. The method of claim 15, wherein n is 3.

19. The method of claim 15, wherein n is 4.

20. The method claim 19, wherein the value of each check number is 0, 1, 2 or 3 so that the check numbers transmitted are each a 2 bit digital number.

21. The method of claim 19, wherein the deriving, comparing and determining step determines that there is one transmission or storage error of positive polarity in a block when the computed check number for a block of words is greater than the received check number for such block by 1 or less than such number by 3, and wherein when a positive error is detected, the introducing step introduces an error of negative polarity in the block to conceal the transmission or storage error.

22. The method of claim 19, wherein the deriving, comparing and determining step determines that there is one transmission or storage error of negative polarity in a block when the computed check number for a block of words is greater than the received check number for such block by 3 or less than such number by 1, and wherein when a negative error is detected, the introducing step introduces an error of positive polarity in the block to conceal the transmission or storage error.

23. The method of claim 19, wherein the deriving, comparing and determining step determines that there are two transmission or storage errors of undetermined polarity in a block when the computed check number for a block of words and the received check number for such block differ by 2, and wherein when two errors of undetermined polarity are detected, the introducing step introduces no errors in the block.

24. The method of claim 14, wherein the introducing step introduces the error, at or close to the center of the block of words, by converting a word containing a bit of value 1 to one containing a bit of value 0 when a positive transmission or storage error has been detected, or by converting a word containing a bit of value 0 to one containing a bit of value 1 when a negative error has been detected.

25. The method of claim 14, wherein the duration of each block of words is less than a predetermined time period which is of the order of 200 microseconds.

* * * * *